(12) United States Patent
Gee

(10) Patent No.: US 8,342,272 B2
(45) Date of Patent: Jan. 1, 2013

(54) CONTROL ALGORITHM FOR HYBRID ELECTRIC VEHICLE

(75) Inventor: Thomas Scott Gee, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 2044 days.

(21) Appl. No.: 10/906,821

(22) Filed: Mar. 8, 2005

(65) Prior Publication Data

US 2005/0139400 A1  Jun. 30, 2005

Related U.S. Application Data

(63) Continuation-in-part of application No. 09/848,032, filed on May 3, 2001, now abandoned.

(51) Int. Cl.
*B60W 10/06* (2006.01)

(52) U.S. Cl. ............ 180/65.265; 180/65.285; 180/65.28

(58) Field of Classification Search ................ 180/65.2, 180/65.8, 65.3, 65.4, 65.28, 65.285, 65.265; 903/943; 123/481, 406.55
See application file for complete search history.

(56) References Cited

U.S. PATENT DOCUMENTS

| | | | |
|---|---|---|---|
| 4,146,006 A | 3/1979 | Garabedian | |
| 4,276,863 A | 7/1981 | Sugasawa et al. | |
| 4,459,951 A | 7/1984 | Tobinaga et al. | |
| 4,473,045 A | 9/1984 | Bolander et al. | |
| 4,945,878 A | 8/1990 | Daly et al. | |
| 4,977,862 A | 12/1990 | Aihara et al. | |
| 5,065,705 A | 11/1991 | Fujimoto et al. | |
| 5,081,365 A | 1/1992 | Field et al. | |
| 5,094,192 A | 3/1992 | Seiffert et al. | |
| 5,099,816 A | 3/1992 | Ohga et al. | |
| 5,133,303 A | 7/1992 | Umehara | |
| 5,264,764 A | 11/1993 | Kuang | |
| 5,343,970 A | 9/1994 | Severinsky | |
| 5,555,871 A | 9/1996 | Gopp et al. | |
| 5,724,951 A | 3/1998 | Mukumoto | |
| 5,769,055 A | 6/1998 | Motose et al. | |
| 6,019,090 A | 2/2000 | Ozawa | |
| 6,321,967 B1 | 11/2001 | Michalik et al. | |
| 6,357,541 B1 | 3/2002 | Matsuda et al. | |
| 6,377,880 B1 | 4/2002 | Kato et al. | |
| 6,429,613 B2 * | 8/2002 | Yanase et al. | 318/139 |
| 6,480,767 B2 * | 11/2002 | Yamaguchi et al. | 701/22 |
| 6,487,477 B1 * | 11/2002 | Woestman et al. | 701/22 |
| 6,488,107 B1 * | 12/2002 | Ochiai et al. | 180/65.2 |
| 6,504,259 B1 * | 1/2003 | Kuroda et al. | 290/40 C |
| 6,837,320 B2 * | 1/2005 | Wakashiro et al. | 180/65.2 |
| 6,886,524 B2 * | 5/2005 | Hanada et al. | 123/198 F |
| 6,943,460 B2 * | 9/2005 | Wakashiro et al. | 290/40 C |
| 7,213,665 B2 * | 5/2007 | Yamaguchi et al. | 180/65.2 |
| 7,225,782 B2 * | 6/2007 | Pallett et al. | 123/192.1 |
| 2004/0045753 A1 * | 3/2004 | Yamaguchi et al. | 180/65.2 |
| 2006/0168944 A1 * | 8/2006 | Inoue et al. | 60/284 |

FOREIGN PATENT DOCUMENTS

| | | |
|---|---|---|
| JP | 40604818 A | 2/1994 |
| JP | 40816103 | 6/1996 |

* cited by examiner

*Primary Examiner* — Jeffrey J Restifo

(74) *Attorney, Agent, or Firm* — Jerome R. Drouillard; David B. Kelley

(57) ABSTRACT

A hybrid electric vehicle (HEV) manages engine operation in the event of an engine cooling system malfunction by operating the engine with fewer than the total number of engine cylinders, while extracting power, particularly during transient operation, from not only the engine, but also the vehicle's traction motor and battery.

3 Claims, 3 Drawing Sheets

CONTROL ALGORITHM FOR HYBRID ELECTRIC VEHICLE

The present application is a continuation-in-part of U.S. patent application Ser. No. 09/848,032, filed on May 3, 2001.

BACKGROUND OF THE INVENTION

1. Field of the Invention

The present invention relates generally to a Hybrid Electric Vehicle (HEV), and specifically to a system and method of allowing an HEV to operate without damage after the HEV engine cooling system has been compromised. This is accomplished by using both the traction motor and the engine to provide power approximating the power output of the engine while operating on all cylinders, while in fact operating the engine with a reduced number of cylinders.

2. Discussion of the Prior Art

The need to reduce fossil fuel consumption and emissions from automobiles and other vehicles powered by Internal Combustion Engines (ICES) is well known. Vehicles powered by electric motors attempt to address these needs. Unfortunately, electric vehicles have limited range and power capabilities. Further, electric vehicles need substantial time to recharge their batteries. An alternative solution is to combine a smaller ICE with an electric traction motor into one vehicle. Such vehicles are typically called Hybrid Electric Vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set. Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gear set transaxle. A first electric motor, the generator, is connected to a sun gear, and the ICE is connected to a carrier. A second electric motor, a traction motor, is connected to a ring (output) gear via additional gearing in the transaxle. Engine torque powers the generator to charge the battery and the resultant torque at the ring gear contributes to the wheel (output shaft) torque. The traction motor is also used to contribute wheel torque and to recover braking energy to charge the battery if a regenerative braking system is used. In this configuration, the generator can selectively provide a reaction torque that may be used to control engine speed. In fact, the engine, generator motor and traction motor can provide a continuously variable speed transmission effect. Further, the HEV presents an opportunity to better control engine idle speed over conventional vehicle by using the generator to control engine speed.

The desirability of combining an ICE with electric motors is clear. There is great potential for reducing vehicle fuel consumption and emissions with no appreciable loss of vehicle performance or drivability. Nevertheless, new ways must be developed to optimize the HEV's potential benefits. One such area of development is in the development of advanced control systems allowing the HEV to continue operation even after an engine coolant system malfunction. It is generally known that malfunctions of engine cooling systems can cause engine damage from the excessive overheating. Such malfunctions often involve loss of coolant. Coolant loss can be sudden due to a leak in the cooling system. Alternatively, overheating malfunctions without coolant loss can occur if the coolant circulation system malfunctions such as a failure of a water pump.

Methods of allowing an engine to continue to operate without damage after coolant system failure are known in the prior art and known as so-called "fail safe cooling." One such prior art method alternates fueling and firing cutoffs to the engine cylinders. For example, U.S. Pat. No. 5,555,871 to Gopp, et al., describes an engine cylinder head temperature sensor and the control system. When the cylinder head temperature exceeds a threshold, the control system deactivates one or more of the engine's cylinders. The control system rotates the deactivation of the cylinder's spark so that no cylinder is constantly fired. While deactivated, fresh air is drawn through the cylinders and cools the engine. Gopp, which is assigned to the assignee of the present invention, has no applicability to operation of an HEV with both an engine and a rotating electrical machine. Rather, Gopp is concerned solely with a conventional engine/transmission configuration.

The prior art also describes alternating fuel flow to deactivate a cylinder bank when a temperature threshold is passed. In this mode, the air fuel mixture of the activated cylinder bank is adjusted to limit vehicle speed and extend the operating time. See generally, U.S. Pat. No. 4,473,045 to Bolander, et al.

Various other overtemperature control systems exist in the prior art. In U.S. Pat. No. 5,094,192 to Seiffert, et al., ignition slows in response to coolant pump failure. This limits the load and speed of the engine.

Other methods reduce engine heat when the coolant system fails to trigger a water pump or cooling fans to cool the engine compartment. U.S. Pat. No. 4,977,862 to Aihara, et al. Similarly, U.S. Pat. No. 5,065,705 to Fujimoto, et al., describes a system based on engine speed that reduces engine power output if it predicts the overheating of the engine.

Although prior art control systems are useful when applied to conventional ICE vehicles, the HEV can utilize additional methods to reduce engine damage when its coolant system fails. For example, it can limit or even shut down engine operation and provide torque through its traction motor. Japanese published application JP 40604818A to Kitada discloses this type of system, in which the HEV engine is shut down if the engine temperature exceeds a predetermined threshold. Unfortunately, such operation severely impairs the operational functionality of the HEV because once the traction battery is depleted, the vehicle will slow to a halt.

The HEV provides other design challenges which remain unsolved in the prior art. For example, prior art systems typically apply to a large ICE with six or more cylinders. In smaller ICES (four cylinder or less) such as those found in an HEV, engine power output, and noise vibration, and harshness (NVH) would be unacceptable using the prior art control systems.

SUMMARY OF THE INVENTION

Accordingly, an object of the present invention is to provide an engine cooling control method and system for a hybrid electric vehicle (HEV) when the engine temperature exceeds a predetermined calibratable level such as when a vehicle coolant system fails.

It is a further object of the present invention to provide a method and system that reduces engine power output and NVH (torque pulsations), whereby the HEV operating range is greatly increased.

It is a further object of the present invention to provide a method and system that reduces maximum engine power output to half its normal operation, whereby acceptable engine temperature, vehicle NVH, and operating range are maintained.

It is a further object of the present invention to provide a method and system to halt engine operation, but allow engine operation if necessary, with a fuel cutoff method to one or more cylinders in an alternating fashion.

It is a further object of the present invention to ensure the HEV does not run in a parallel mode, whereby the generator is not coupled to the engine for production of charge for the battery. This method and system will isolate torque propulsions from the wheels and reduce the NVH.

It is a further object of the present invention to force engine operation at a speed that is optimized for reduced NVH and reduced engine temperature.

It is a further object of the present invention to control the HEV cooling fans to an optimal speed to minimize electrical load while maximizing air circulation, based on HEV speed and engine temperature.

The present invention overcomes the problems associated with the previously cited Gopp and Kitada references in a new and unobvious manner.

It is an advantage of the present invention that an HEV may be operated with an engine having compromised cooling, by operating the engine with fewer than the engine's total number of cylinders, and by supplementing the engine's output with the output of the HEV's traction motor and battery. This is permitted by periodically recharging the battery even when the engine is operating with fewer than the maximum number of cylinders because of a cooling system failure.

Other objects, as well as features and advantages of the present invention, will become apparent to the reader of this specification.

DETAILED DESCRIPTION OF THE PREFERRED EMBODIMENTS

Figure 1:
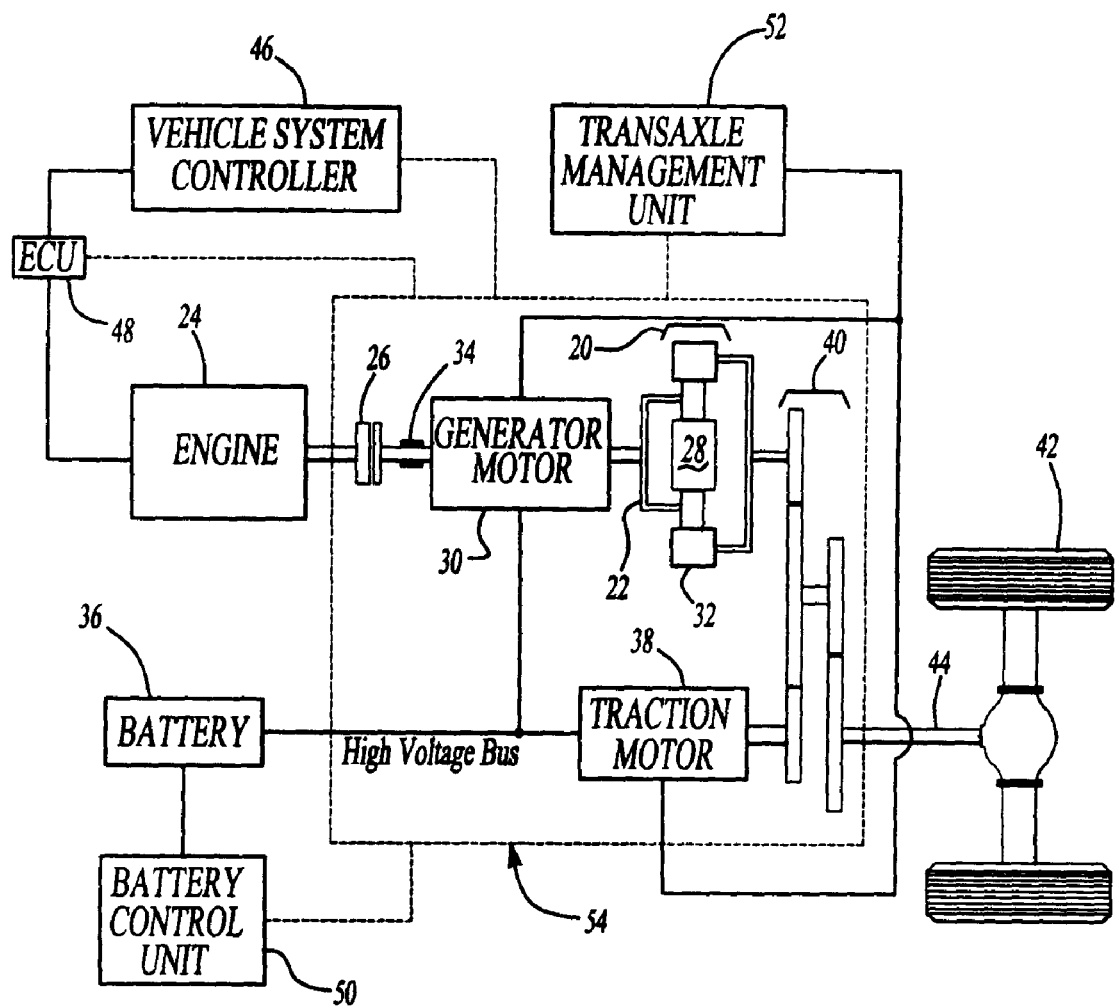
FIG. 1 illustrates a general hybrid electric vehicle (HEV) configuration.

As shown in FIG. 1, planetary gearset 20 mechanically couples a carrier gear 22 to engine 24 via one way clutch 26. Planetary gear set 20 also mechanically couples sun gear 28 to generator motor 30 and to ring (output) gear 32. The generator motor 30 also mechanically links to generator brake 34 and is electrically linked to battery 36. Traction motor 38 is mechanically coupled to ring gear 32. Ring gear 32 traction motor 38 are mechanically coupled to drive wheels 42 via output shaft 44.

Planetary gearset 20 splits the output energy of engine 24 into a series path from engine 24 to generator motor 30 and a parallel path from the engine 24 to drive wheels 42. The speed of engine 24 can be controlled by varying the split to the series path while maintaining a mechanical connection through the parallel path. Traction motor 38 augments the power output of engine 24 to drive wheels 42 on the parallel path through second gearset 40. Traction motor 38 also provides the opportunity to use energy directly from the series path, essentially running off power created by the generator motor 30, thereby reducing losses associated with converting energy into and out of chemical energy in battery 36.

Vehicle system Controller (VSC) 46 controls many components in this HEV configuration by connecting to each component's controller. VSC 46 also contains a Powertrain Control Module (PCM). VSC 46 and the PCM, though housed in the same unit, are actually separate controllers.

VSC 46 connects to engine 24 via a hardwire interface and Engine Control Unit (ECU) 48. ECU 48 and VSC 46, like the PCM, can be based in the same unit, but are actually separate controllers. VSC 46 also connects: to a Battery Control Unit (BCU) 50, and a Transaxle Management Unit (TMU) 52 through a communication network such as controller area network 54. BCU 50 connects to battery 36 via a hardwire interface. TMU 52 controls generator motor 30 and traction motor 38 via the hardwire interface.

Figure 2:
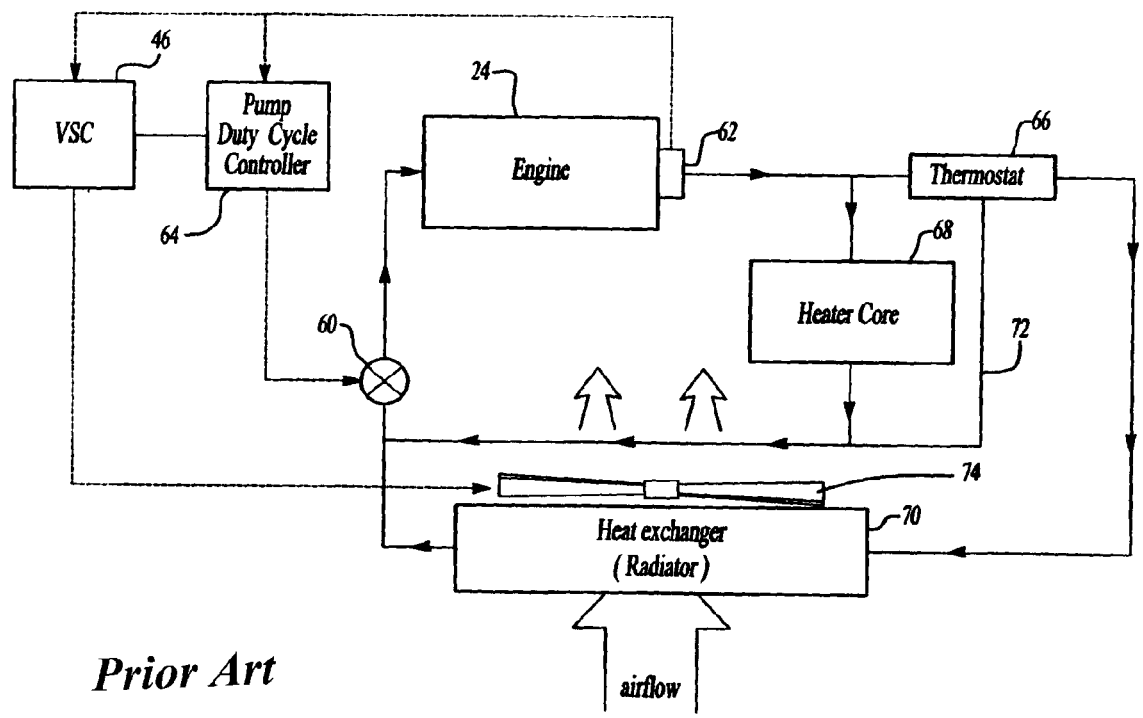
FIG. 2 illustrates a prior art engine coolant system configuration with an electric coolant pump.

The basic HEV configuration can also have a variety of ways to cool engine 24. For purposes of demonstrating the preferred embodiment of the present invention, a prior art cooling system schematic for a conventional vehicle with an electric coolant pump is shown in FIG. 2. Electric coolant Pump 60 pumps coolant to engine 24. As coolant passes through engine 24, it absorbs heat, by conduction. Temperature is measured by Engine Temperature Sensor (ETS) 62 and sent to pump duty cycle controller 64 under the control of VSC 46. ETS 62 can be an engine coolant temperature sensor or a cylinder head temperature sensor.

The speed of electric coolant pump 60 is controlled in accordance with the signal from ETS 62. For example, when engine 24 temperature is relatively high, electric coolant pump 60 is on at 100% volumetric flow rate. The coolant continues through the loop to thermostat 66 and heater core 68, which rejects heat from the coolant to the passenger compartment based on driver demand such as a dash panel selection for heat and blower speed. Thermostat 66 controls the amount of coolant allowed through a heat exchanger path of the system.

When the coolant is hot, the thermostat 66 allows the coolant to proceed to heat exchanger (radiator) 70 where airflow across radiator 70 draws heat out of the coolant. Airflow can be increased across the radiator 70 by adding at least one cooling fan 74 under the control of the VSC.

From radiator 70, the coolant is drawn back to electric coolant pump 60. When the coolant is cool, thermostat 66 allows the coolant to proceed immediately back to electric coolant pump 60 through a thermostat bypass path 72 path and heater core 68 of the system. Because heater core 68 also receives coolant, it acts as a heat exchanger that vents heat from the coolant into the passenger compartment when requested. After leaving heater core 68, the coolant proceeds back to the electric coolant pump 60.

The present invention provides a method and system within VSC 46 to allow the vehicle to continue operation when the coolant system has failed. One portion of this strategy alternates fueling and firing cylinders of engine 24 in a managed cooling mode. This method and system result in engine 24 effectively producing half its normal power output and additional noise vibration and harshness (NVH) due to the additional time between firing events in this managed cooling mode. Further, in the HEV, engine 24 is smaller than in conventional vehicles and engine 24 operation is not as closely tied to vehicle operation. Engine 24's speed can be independent of vehicle speed, and Engine 24 NVH can be isolated from drive wheels 42. The present invention allows VSC 46 to manage the operation of engine 24 to maintain acceptable engine temperature, vehicle NVH, and extended operating range.

Figure 3:
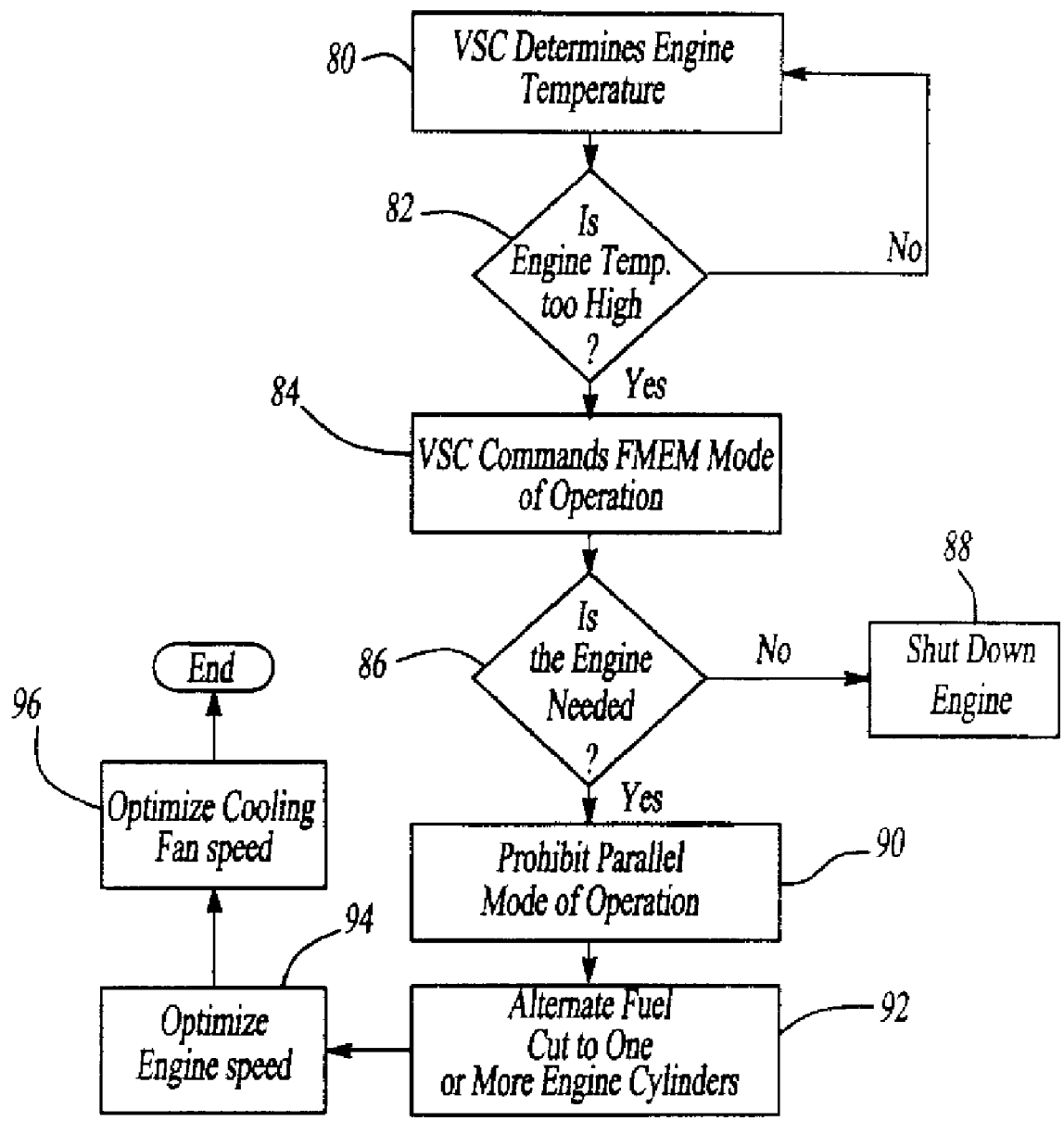
FIG. 3 illustrates the control strategy of the present invention.

The control system and method of the present invention are illustrated by the flow diagram of FIG. 3. VSC 46 monitors engine 24 temperature from ETS 62 at block 80. At block 82, the VSC 46 determines if engine 24 temperature is greater than a predetermined maximum temperature threshold. If engine 24 temperature does not exceed this threshold, engine 24 will continue to be operated with all of its cylinders so as to maintain the battery state of charge within a normal maximum charge limit and a normal minimum charge limit. If engine 24 temperature is too high, as defined by this calibratable threshold, VSC 46 commands the Fractional Mode Engine Management (FMEM) mode at block 84. This temperature threshold would be set where it is likely that the vehicle coolant system has malfunctioned, or for whatever reason, engine 24 is at a sufficiently high temperature where damage could result if it continues to operate with all cylinders.

In the FMEM mode of operation, the algorithm checks to see if engine 24 is needed to be operating at block 86. Engine 24 operation may be required due to, for example, driver demand, battery state of charge, and air conditioning operation. If engine 24 operation is not required, the VSC will force engine 24 off at block 88. If engine 24 operation is required, the VSC restricts the system from being in a parallel mode (i.e., it ensures that generator brake 34 is not applied) at block 90. This will isolate torque pulsations from the wheels, thus reducing the operator perceived NVH. While operating in the FMEM mode of operation, engine 24 will, as noted above, be operated at a reduced power level with fewer than all of its cylinders, so as to maintain the battery state of charge between a modified maximum charge limit and a modified minimum charge limit. At the same time, traction motor 38 and battery 36 will be employed to provide added power sufficient to approximate operation, at least during transients, with engine 34 at full power.

The modified minimum charge limit is usually lower than the normal minimum charge limit. The modified maximum charge limit may be either the same as, or less than the normal maximum charge limit.

At block 92, fuel is cut to one or more of engine's 24 cylinders in an alternating fashion. This controls engine 24's temperature by allowing alternating cylinders to cool because combustion is not occurring and cool air is passed through when there is no fuel to that cylinder.

Next, at block 94, engine 24 is forced to operate at the predetermined calibratable speed that optimizes NVH and engine 24 temperature.

Next, at block 96, the speed of cooling fans 74 is controlled in accordance with a signal from VSC 46. For example, when engine 24 temperature is relatively high, cooling fans 74 operate at high speed to force air across not only heat exchanger 70, but also directly over engine 24. Nevertheless, the VSC controls cooling fan speed to minimize electrical load and maximize air circulation based on vehicle speed and engine 24 temperature.

The present invention, as described above, is designed to allow VSC 46 to manage the vehicle operation to maintain acceptable engine 24 temperature, to minimize vehicle NVH, and to allow unlimited vehicle operating range, using both traction motor 38 and engine 24 in the event of a compromise in the engine's cooling system.

The above described embodiment of the invention is provided purely for purposes of example. Many other variations, modifications, and applications of the invention may be made.

What is claimed is:

1. A method for operating a hybrid electric vehicle having a multicylinder internal combustion engine and a traction motor and traction battery, comprising the steps of:
    sensing the operating temperature of the internal combustion engine;
    sensing the state of charge of the traction battery; and
    providing driving power simultaneously from the traction motor and the engine during transient operation, sufficient to approximate the level of power available from the engine operating with all cylinders, while operating the engine at a reduced power level with fewer than the maximum number of cylinders, in the event that the operating temperature of the engine is greater than a predetermined threshold temperature and the battery state of charge is below a calculated charge limit.

2. A method according to claim 1, wherein said calculated charge limit is a function of at least driver demand.

3. A method according to claim 1, wherein said calculated charge limit is a function of at least driver demand and air conditioning usage.

* * * * *